United States Patent
Harmon et al.

(10) Patent No.: US 12,425,465 B2
(45) Date of Patent: *Sep. 23, 2025

(54) SYSTEMS AND METHODS FOR SWITCHING BETWEEN MEDIA CONTENT

(71) Applicant: Spotify AB, Stockholm (SE)

(72) Inventors: Aaron Paul Harmon, New York, NY (US); Adam Shonkoff, Reading, MA (US); Bradford Lage, Cranston, RI (US); Johanna Anderson Favole, Franklin, MA (US); Justin David Covington, Nashville, TN (US); Paul Lamere, Bath, ME (US); Timothy Andrew Chagnon, Concord, MA (US); Debra Lynn McDonald, San Francisco, CA (US); Matthew Julian Seaton, Somerville, MA (US); Matthew Budelman, Providence, RI (US); Scott Kagan, Newton, MA (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,387

(22) Filed: Jan. 17, 2024

(65) Prior Publication Data

US 2024/0223635 A1 Jul. 4, 2024

Related U.S. Application Data

(63) Continuation of application No. 17/825,996, filed on May 26, 2022, now Pat. No. 11,909,797.

(Continued)

(51) Int. Cl.
*H04L 65/613* (2022.01)
*H04L 65/1089* (2022.01)

(52) U.S. Cl.
CPC ........ *H04L 65/613* (2022.05); *H04L 65/1089* (2013.01)

(58) Field of Classification Search
CPC .. H04L 65/613; H04L 65/1089; H04L 65/612
See application file for complete search history.

(56) References Cited

U.S. PATENT DOCUMENTS

| | | | |
|---|---|---|---|
| 6,446,080 B1 * | 9/2002 | Van Ryzin | G11B 27/11 707/999.102 |
| 7,743,009 B2 | 6/2010 | Hangartner et al. | |

(Continued)

FOREIGN PATENT DOCUMENTS

WO  WO-2007060605 A2 *  5/2007  ........... G10H 1/0058

OTHER PUBLICATIONS

Harmon, Office Action, U.S. Appl. No. 17/825,996, filed Jun. 8, 2023, 11 pgs.

(Continued)

*Primary Examiner* — Oanh Duong
(74) *Attorney, Agent, or Firm* — Morgan, Lewis & Bockius LLP

(57) ABSTRACT

A method for personalizing media content for a user is provided. The method includes, at an electronic device, streaming a first media item from a first set of media items, the first set of media items compiled using a first recommendation hypothesis. The method further includes, while streaming the first media item, in response to a first user request, selecting, without user intervention, a second set of media items, distinct from the first set of media items, including determining a presentation order of a plurality of sets of media items using a heuristic applied to the plurality of sets of media items. The second set of media items is compiled using a second recommendation hypothesis, wherein the second recommendation hypothesis is distinct (Continued)

from the first recommendation hypothesis. The method includes streaming a second media item from the second set of media items.

19 Claims, 11 Drawing Sheets

Related U.S. Application Data

(60) Provisional application No. 63/283,915, filed on Nov. 29, 2021.

(56) References Cited

U.S. PATENT DOCUMENTS

| | | | |
|---|---|---|---|
| 7,987,148 B2 | 7/2011 | Hangartner et al. | |
| 8,214,315 B2 | 7/2012 | Hangartner et al. | |
| 8,473,628 B2 * | 6/2013 | Kapoor | G06F 16/4387 725/47 |
| 9,148,702 B1 * | 9/2015 | Ko | H04N 21/47214 |
| 9,961,402 B1 * | 5/2018 | Balasubramanian | G06Q 30/02 |
| 10,313,755 B2 | 6/2019 | Kimble et al. | |
| 10,481,762 B2 | 11/2019 | Olofsson | |
| 11,704,359 B2 | 7/2023 | Ip et al. | |
| 11,909,797 B2 * | 2/2024 | Harmon | H04L 65/1089 |
| 12,001,650 B2 * | 6/2024 | Yang | H04N 21/4825 |
| 2006/0212478 A1 | 9/2006 | Plastina et al. | |
| 2008/0005348 A1 * | 1/2008 | Kosiba | H04N 21/222 709/231 |
| 2008/0301173 A1 * | 12/2008 | Ryu | G06F 16/683 707/999.102 |
| 2010/0042595 A1 | 2/2010 | Chen et al. | |
| 2010/0121866 A1 | 5/2010 | Bell et al. | |
| 2010/0235739 A1 * | 9/2010 | Rathi | G11B 27/105 715/716 |
| 2011/0247038 A1 * | 10/2011 | Roberts | H04N 21/47 386/E5.003 |
| 2013/0073280 A1 | 3/2013 | O'Neil et al. | |
| 2015/0074059 A1 * | 3/2015 | Bilinski | G06F 16/40 707/649 |
| 2015/0212668 A1 | 7/2015 | Olofsson | |
| 2016/0364133 A1 * | 12/2016 | Hosaka | A63F 13/493 |
| 2018/0054592 A1 | 2/2018 | Jehan et al. | |
| 2018/0188945 A1 * | 7/2018 | Garmark | G06F 3/167 |
| 2019/0324984 A1 | 10/2019 | Fukuda et al. | |
| 2020/0364260 A1 | 11/2020 | Mukhopadhyay et al. | |
| 2020/0401622 A1 | 12/2020 | McDevitt et al. | |
| 2021/0287307 A1 | 9/2021 | Schneider et al. | |
| 2022/0148592 A1 * | 5/2022 | Maury | G10L 15/22 |

OTHER PUBLICATIONS

Harmon, Notice of Allowance, U.S. Appl. No. 17/825,996, filed Oct. 20, 2023, 6 pgs.

* cited by examiner

600

Stream (602) a first media item from a first set of media items, the first set of media items compiled using a first recommendation hypothesis.

> The first recommendation hypothesis for compiling the first set of media items is (604) based on one or more of a genre of media items, a decade of media items, a mood of media items, an artist of media items, and whether media items have previously been presented to the user.

While streaming the first media item, in response to a first user request, select (606), without user intervention, a second set of media items, distinct from the first set of media items, the second set of media items compiled using a second recommendation hypothesis, the second recommendation hypothesis is distinct from the first recommendation hypothesis.

> The first user request is a request (608) to change to a different set of media items.

Selecting (610) the second set of media items comprises determining a presentation order of a plurality of sets of media items using a heuristic applied to the plurality of sets of media items, wherein the second set of media items is selected as a next set of media items after the first set of media items in the presentation order.

> The heuristic is (611) based on one or more of: a playback history of the user, user inputs in a current session user inputs in previous sessions, and user profile information.

SYSTEMS AND METHODS FOR SWITCHING BETWEEN MEDIA CONTENT

PRIORITY APPLICATION

This application is a continuation of U.S. application Ser. No. 17/825,996, filed May 26, 2022, which claims priority to U.S. Prov. App. No. 63/283,915, filed Nov. 29, 2021, each of which is hereby incorporated by reference in its entirety.

TECHNICAL FIELD

The disclosed embodiments relate generally to media provider systems, and, in particular, to switching between media content (e.g., switching between different curated playlists generated based on different content hypotheses).

BACKGROUND

Recent years have shown a remarkable growth in consumption of digital goods such as digital music, movies, books, and podcasts, among many others. The overwhelmingly large number of these goods often makes navigation and discovery of new digital goods a difficult task. Some streaming services provide curated content (e.g., in the form of playlists), even curated content that is personalized to the user, but the user interfaces for navigating between different curated content (e.g., navigating between playlists) can be cumbersome. For example, to "try out" a different playlist, a user may have to search for a particular playlist and/or navigate to a home screen user interface to view playlist options. Doing so also forces the user to think linguistically about what music to listen to, e.g., by searching or requesting a song, artist, or genre by name, rather than selecting based on intuition or emotion. These problems make it difficult for users to find content that suits their mood.

SUMMARY

There is a need for improved user interfaces for navigating between playlists and other types of content recommendations. In particular, some embodiments of the present invention enable a user of a streaming media service to easily change the type of music that's playing (e.g., through a "next shuffle" option), allowing the user to browse with his or her ears. When the user selects the next shuffle option, the streaming media service provides content from a different recommendation hypothesis (e.g., a different curated playlist).

To that end, in accordance with some embodiments, a method is provided. The method includes streaming a first media item from a first set of media items. The first set of media items is compiled using a first recommendation hypothesis. The method further includes, while streaming the first media item, in response to a first user request, selecting, without user intervention, a second set of media items, distinct from the first set of media items, including determining a presentation order of a plurality of sets of media items using a heuristic applied to the plurality of sets of media items. The second set of media items is selected as a next set of media items after the first set of media items in the presentation order and the second set of media items is compiled using a second recommendation hypothesis. The second recommendation hypothesis is distinct from the first recommendation hypothesis. The method includes streaming a second media item from the second set of media items.

In accordance with some embodiments, a computer system is provided. The computer system includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by a computer system with one or more processors. The one or more programs comprising instructions for performing any of the methods described herein.

Thus, systems are provided for personalizing media content for a user.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 6A-6D are flow diagrams illustrating a method for streaming media content from sets of media items for a user, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
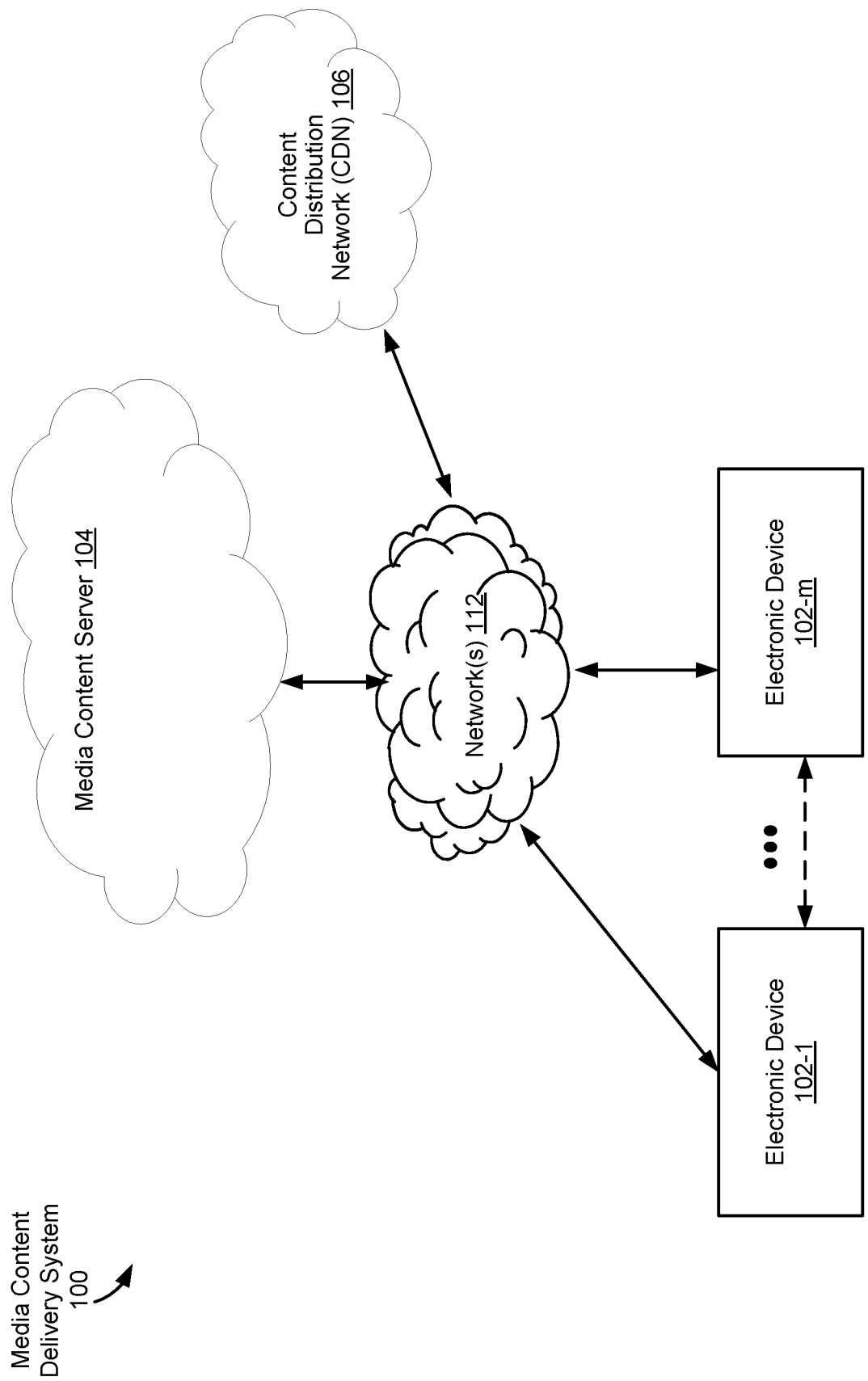
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
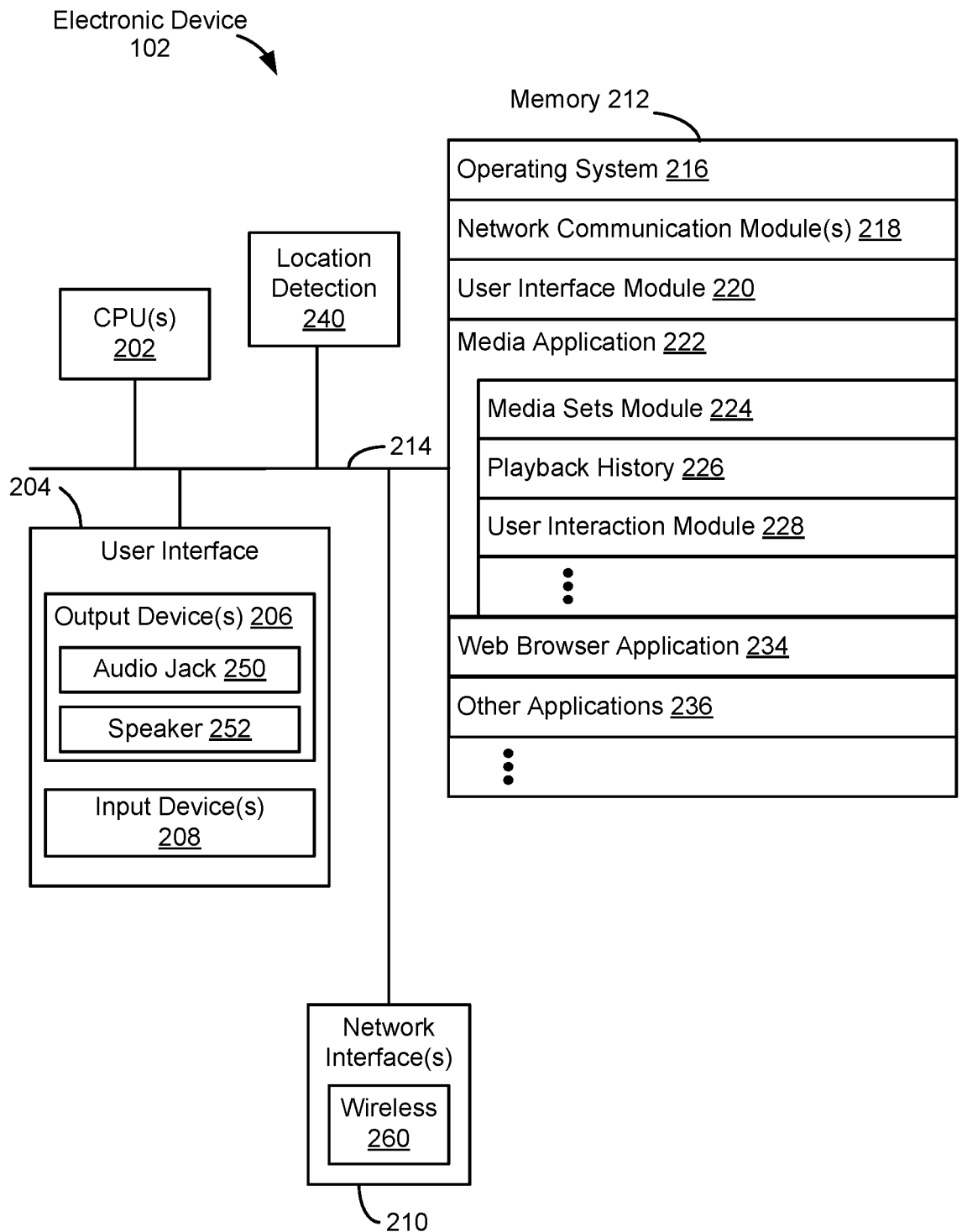
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the electronic device 102 to other computing devices (e.g., media presentation system(s), media content server 104, and/or other electronic devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

- a media sets module 224 for generating (e.g., using a variety of recommendation hypotheses) and/or storing a plurality of sets of media items (e.g., a plurality of playlists) for streaming to the user of electronic device 102;
- a playback history 226 for storing (e.g., in a list) indications of media items (e.g., and/or playlists) that have previously been consumed by the user (e.g., associated with the account for media application 222), including storing taste profile information with predicted preferences of the user based on the user's playback history;
- user interaction module 228 for tracking and/or determining user interactions with media items provided by media application 222 (e.g., for use in selecting media items to recommend to the user);
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
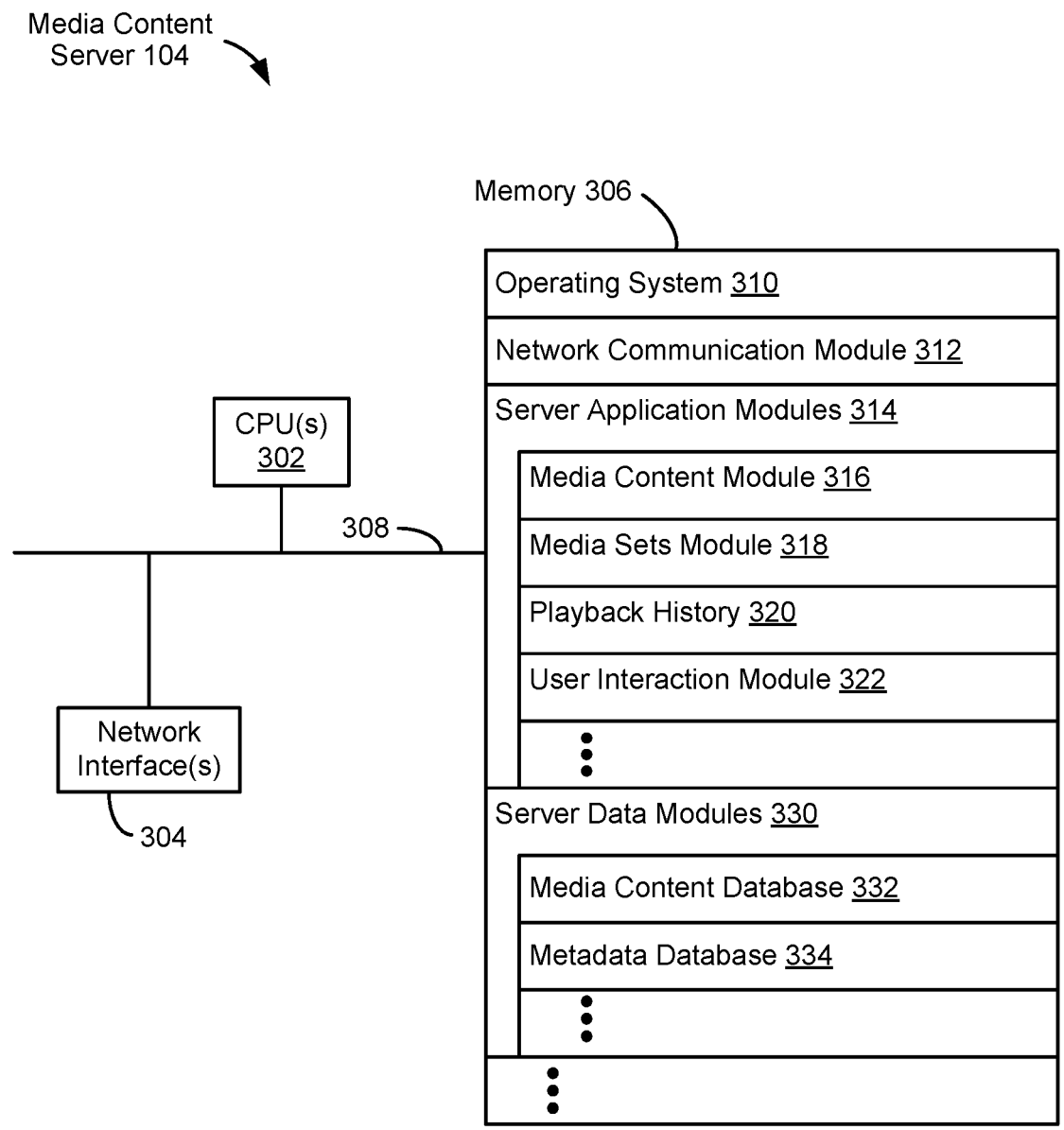
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s);
  - media sets module 318 for generating (e.g., using a variety of recommendation hypotheses) and/or storing a plurality of sets of media items (e.g., a plurality of playlists) for streaming to the user of electronic device 102;
  - a playback history 320 for storing (e.g., in a list) indications of media items (e.g., and/or playlists) that have previously been consumed by the user, including storing taste profile information with predicted preferences of the user based on the user's playback history; and
  - user interaction module 228 for tracking user interactions with media items and/or for selecting, based on the user interactions, media items to recommend to the user;
- one or more server data module(s) 330 for handling the storage of and/or access to media items and/or metadata relating to the media items; in some embodiments, the one or more server data module(s) 330 include:
  - a media content database 332 for storing media items; and
  - a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4B:
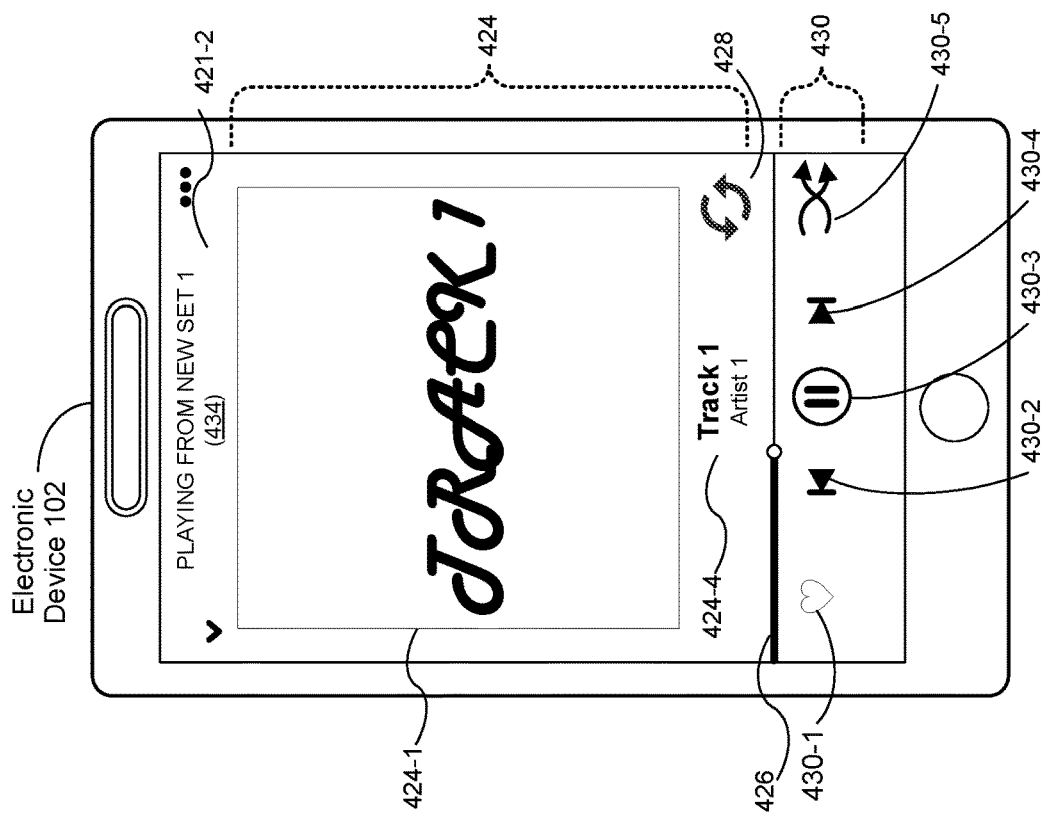
FIGS. 4A-4D illustrate graphical user interfaces that include a next shuffle button, in accordance with some embodiments.
Figure 4A:
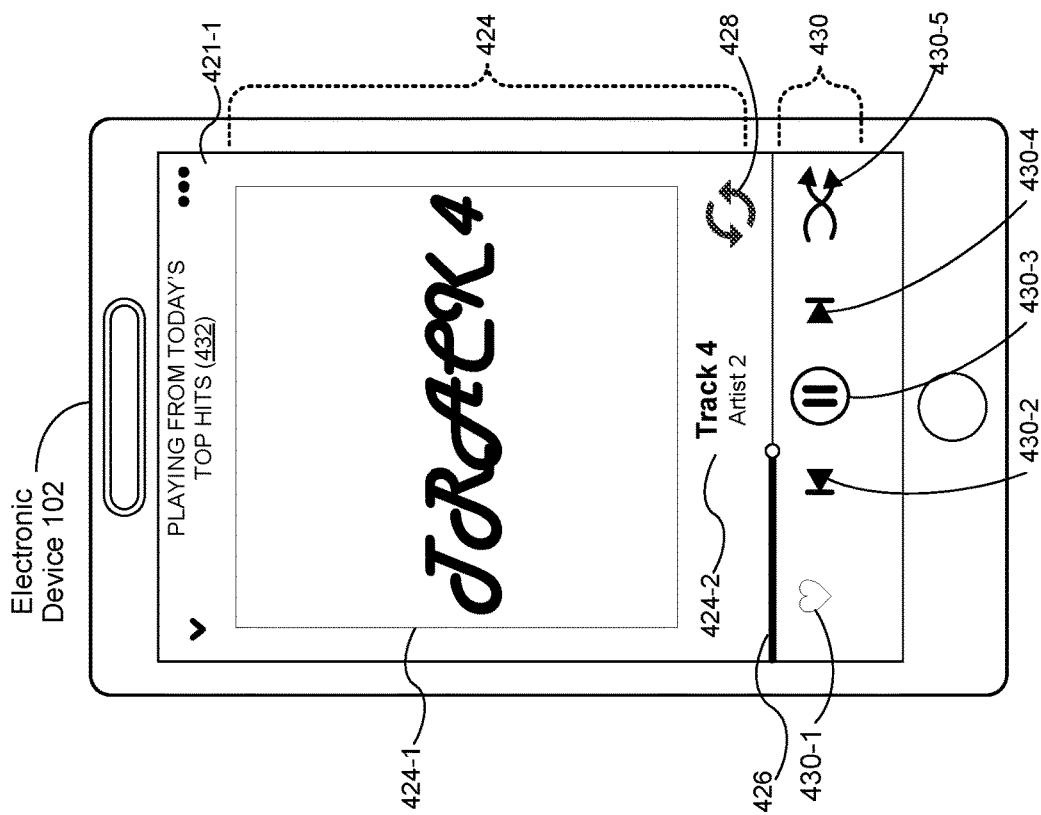

FIGS. 4A-4B illustrate graphical user interfaces 421-1 and 421-2 presented on electronic device 102 during a playback session for a user. For example, during the playback session, media content is streamed (e.g., from media content server 104) for presentation at the electronic device 102 and/or at another electronic device distinct from the electronic device (e.g., a presentation device).

User interfaces 421-1 and 421-2 correspond to user interfaces that are displayed on the first electronic device 102 during a first playback session (e.g., at different periods in time during the first playback session). In some embodiments, user interfaces 421-1 and 421-2 display information for media content that is streaming at a current respective time to electronic device 102 during the first playback session (e.g., user interface 421-1 is displayed at a first time while Track 4 is playing back, and user interface 421-2 is displayed at a second (e.g., later) time while Track 1 is playing back). In some embodiments, the displayed information includes metadata of the media item that is currently being presented, as well as one or more playback controls (e.g., controls 430) for controlling playback of the media item. For example, the metadata includes cover art image 424-1, a title of the media item and/or artist information 424-2 for the media item (e.g., "Track 4," "Artist 2"). In some embodiments, the one or more playback controls 430 include a control to "heart" 430-1 (e.g., indicate as a favorite) the media item, skip to a previous media item 430-2, pause (e.g., or play) 430-3 the media item, skip to a next media item 430-4, and/or shuffle 430-5 the media items (e.g., for shuffling an order of presentation of the media items within a first set of media items). In some embodiments, the media item is played back from a set of media items (e.g., a first playlist) that are arranged in a first order for playback, such that the user is enabled to skip to a previous and/or next media item within the set of media items arranged in the first order.

In some embodiments, the displayed information also includes context data regarding the playback of the media content. For example, media scrubber control 426 (e.g., including a playhead that indicates a current playback point in a media item and that, when dragged across a timeline, changes the point in time from which the media item is played back) is presented on the electronic device.

In some embodiments, the graphical user interfaces 421-1 and 421-2 also include a next shuffle option 428, which allows the user to request that a different set of media items be provided to electronic device 102, as described in more detail below. For example, in addition to displaying a control for skipping to a next media item 430-4, the electronic device 102 displays next shuffle option 428 for changing the set of media items from which a next media item is selected for playback (e.g., instead of playing back another media item from the first playlist, the device plays back a media item from a second playlist distinct from the first playlist). In some embodiments, the next set of media items provided to the user in response to the user selecting the next shuffle option 428 is selected automatically by the electronic device 102 (e.g., or media content server 104) without additional user input. In some embodiments, the user is enabled to activate the next shuffle option 428 using a voice command.

For example, before the user selects the next shuffle option 428, a first media item 424-2 from a first set of media items 432 (e.g., a first playlist) is streaming (e.g., from a media content server 104) on electronic device 102 (e.g., playing back on electronic device 102, or playing back on a distinct electronic device). For example, as illustrated in interface 421-1, "Track 4" is a first media item 424-2 that is playing back from a playlist entitled "Today's Top Hits" (e.g., first set of media items 432).

In some embodiments, the first set of media items 432 (e.g., "Today's Top Hits") includes a plurality of media items arranged in a first order (e.g., and are presented for playback in the first order). For example, the user is enabled to select the skip to a previous media item (using control 430-2) and/or next media item (e.g., using control 430-4) to navigate playback of media items within the first set of media items (e.g., within "Today's Top Hits").

In some embodiments, the first set of media items 432 is a first playlist compiled using a first recommendation hypothesis (e.g., a first recommendation algorithm used to curate the first playlist). For example, "Today's Top Hits" includes media items that are selected using a first recommendation hypothesis based on the popularity and/or date associated with the media items (e.g., the 25 most-streamed media items available from the media-providing service that were released within the last 3 months).

In some embodiments, the first recommendation hypothesis is based on a genre of media items, a decade of media items, a mood of media items, an artist of media items and/or whether the media item has previously been presented to the user (e.g., played back, in accordance with the embodiments described herein (e.g., automatically), or presented on a display as an option). In some embodiments, the first recommendation hypothesis is associated with a first category of a predefined set of categories, as described in more detail with reference to FIG. 5B. For example, the first set of media items is associated with the first category, and the first recommendation hypothesis selects the first set of media items from all of the sets of media items that are also associated with the first category (e.g., the first recommendation hypothesis ranks the playlists that are considered to be in the first category). In some embodiments, the first set of media items is curated automatically (e.g., without user input) by the media-providing service. In some embodiments, the first set of media items is generated for the user based at least in part on a playback history of the user. For example, the media providing service generates a playlist (e.g., a first set of media items) for the user according to a taste profile that the media providing service determines and/or stores for the user (e.g., based on media items that the user has previously consumed).

For example, media items provided by the media-providing service are represented as vectors that describe properties of the media items. For example, a respective vector representing a respective media item is generated based on a combination of information about the respective media item, such as tempo, genre, artist, playlist, and/or other descriptive features of the media item. In some embodiments, a vector representing the user of the media-providing service is also generated. For example, the vector representing the user describes features of the user, such as demographic information, taste profile information (e.g., the genre, artists, or types of media content the user prefers to consume, which can be based on a playback history of the user), playback history information (e.g., does the user tend to access media content at particular times of the day, use the shuffle feature, etc.), and any other information known about the user. In some embodiments, the first recommendation hypothesis selects media items for the user based on vector distances (e.g., Euclidian distances) between respective media items and/or between media items and the vector representing the user. As such, in some embodiments, the recommendation hypothesis incorporates personalized recommendations based on the user's tastes.

In some embodiments, the media providing service generates a plurality of playlists, each playlist including a set of recommended media items (e.g., in a predefined order) that are grouped in the playlist based on one or more common features of the media items (e.g., features determined according to the recommendation hypothesis). In some embodiments, each generated playlist is associated with a category from a predefined set of categories (e.g., as described with reference to FIG. 5B). For example, the media providing service curates a second playlist, distinct from the first playlist, using a second recommendation hypothesis (e.g., a second recommendation algorithm), and optionally stores the second playlist in a different category than the first playlist. In some embodiments, the second recommendation hypothesis uses vector representations, as described above, to generate the second playlist (e.g., with different weights applied to different features used to generate the vectors and/or by selecting media items that are located within a different portion of the vector space than the media items selected for the first playlist). For example, a seed media item is selected having a vector representation for the seed media item, and additional media items are included in the second playlist, with the seed media item, in accordance with the additional media items corresponding to vectors that are within a predefined vector distance from the vector of the seed media item. For example, the second recommendation hypothesis is based on a genre of media items (e.g., a playlist curated for a radio intended for "Pop" music), wherein a seed media item (e.g., having the genre "Pop") is used to identify additional media items (e.g., that also have the genre "Pop") to include in the second playlist. In some embodiments, the media items selected for the second playlist are not selected using the vector representing the user (e.g., the playlist is not personalized for the user).

It will be understood that additional and/or alternative recommendation hypotheses (e.g., based on a combination of features of the media items) may be used to generate different sets of media items (e.g., playlists).

In some embodiments, the electronic device 102-1 detects that a user has selected (e.g., via a tap input or a voice command) next shuffle option 428 (e.g., while streaming the first media item 424-2). In some embodiments, in response to detecting the user's selection of next shuffle option 428, device 102 ceases playing back the current media item selected from the first playlist (e.g., Track 4 from "Today's Top Hits"), and initiates playback of a media item from a second playlist, distinct from the first media item (e.g., "Track 1" from "New Set 1", shown in FIG. 4B).

For example, in FIG. 4B, a second set of media items 434 ("New Set 1") is selected without user intervention (e.g., the second set of media items comprises a predicted set of media items for the user). In some embodiments, the second set of media items 434 is compiled using the second recommendation hypothesis, which is distinct from the first recommendation hypothesis, as described above. For example, a second media item 424-4 from the second set of media items 434 is streamed to electronic device 102 (e.g., Track 1, from "New Set 1" is provided to electronic device 102).

In some embodiments, as described with reference to FIG. 5A, the electronic device initially stores (e.g., in a data structure) a list of sets of media items (e.g., a list of a plurality of playlists), each set of media items curated according to a different recommendation hypothesis (e.g., a daily mix playlist, a genre-specific playlist, an artist-specific playlist, a user-personalized mix of most-played media playlist, etc.). In some embodiments, the electronic device selects an initial order of the sets of media items to present to the user (e.g., playlist 1, playlist 2, playlist 3, etc.) based on a stored playback history of the user (e.g., stored as playback history 226 and/or playback history 320).

In some embodiments, the order in which to present the sets of media items (e.g., the order of the playlists provided) to the user (e.g., in response to the user selecting next shuffle option 428) is selected using a heuristic applied to the sets of media items (e.g., the playlists in the list of playlists). For example, using the heuristic, the electronic device initially determines to provide the user with playlists in the following order: playlist 1, playlist 2, playlist 3, and playlist 4. In some embodiments, the heuristic is based on one or more of a playback history of the user, user inputs in a current session, user inputs in previous sessions and user profile information including whether the user is a premium user or a non-premium user. In some embodiments, the heuristic is a first heuristic that defines an order of presenting playlists according to respective categories. For example, the first heuristic determines that a playlist associated with Category A is followed by a playlist associated with Category B. In some embodiments, a second heuristic is then used to select which playlist (e.g., an order of the playlists), of the playlists that are associated with Category A, will be selected the next time Category A is up next.

In some embodiments, the heuristic (e.g., the first heuristic and/or the second heuristic) is updated (e.g., and thus the order of the sets of media items is changed in accordance with the updated heuristic) based at least in part on user interactions detected during the current playback session. As such, both the order of the categories of playlists and the order of the playlists within each category may be updated in accordance with user interactions. For example, the electronic device detects one or more user inputs (e.g., a user input selecting to skip to a next media item using control 430-4), and updates the order of playlists in accordance with the one or more user inputs. For example, in accordance with the user providing a user input to skip to a next media item while a media item of a first artist is playing back, the electronic device updates the heuristic to reflect the user not wanting to play back the media item with the first artist (e.g., or artists of that style), and the order of presentation of the playlists is updated in accordance with the heuristic. For example, using the updated heuristic, a playlist that includes media items having the first artist (e.g., "playlist 2") is not presented after playlist 1 (e.g., in response to the user selecting the next shuffle button 428). Instead, the electronic device reorders the initial order of the playlists based on the updated heuristic to play the playlists in the following order: playlist 1, playlist 3, playlist 4, playlist 2 (e.g., wherein a new playlist is presented each time the user selects the next shuffle button 428).

Accordingly, as the electronic device presents the user with different sets of media items (e.g., in response to the user selecting the next shuffle button 428), the heuristic continues to be updated (e.g., and the order for the sets of media items to be provided to the user is changed) based at least in part on user interactions. The electronic device is thus able to determine one or more user preferences for the current playback session (e.g., based on the detected user interactions with various media items), and update the order of presenting the playlists based on the user preferences. Note that the user preferences for the current playback session may differ from the user's general/global preferences (i.e., preferences that are not tethered to any particular playback session), thus allowing the next shuffle option 428 to efficiently search for a content recommendation hypothesis that suits the user's current mood.

In some embodiments, in addition to updating a presentation order in which to present different playlists to the user (e.g., in response to the user selecting the next shuffle option 428), the electronic device also determines, for a respective playlist, an order for providing the media items within the playlist. For example, the electronic device determines, based on user interactions and/or user preferences (e.g., determined from a playback history of the user), an order in which to present media items from a respective playlist. In some embodiments, the order for providing media items within the playlist is based on the user's behavior within the current playback session as well as the user's behavior more generally (e.g., with different weights applied). Thus, in some embodiments, both the selection and/or ordering of the playlists and the selection and/or ordering of content within the playlist are "statefully aware," meaning that both are dependent on the user's behavior within the current listening session.

In some embodiments, the second set of media items 434 (e.g., the second playlist) does not include any media items previously streamed in first set of media items 432 (e.g., the first playlist). For example, the second set of media items 434 is selected in accordance with a determination that a previously presented media item, within the current playback session, is not included in the second set of media items. In some embodiments, the electronic device excludes one or more media items from the second set of media items that have previously been presented to the user (e.g., within the current playback session), to avoid repeating playback of media items within a same playback session.

Figure 4D:
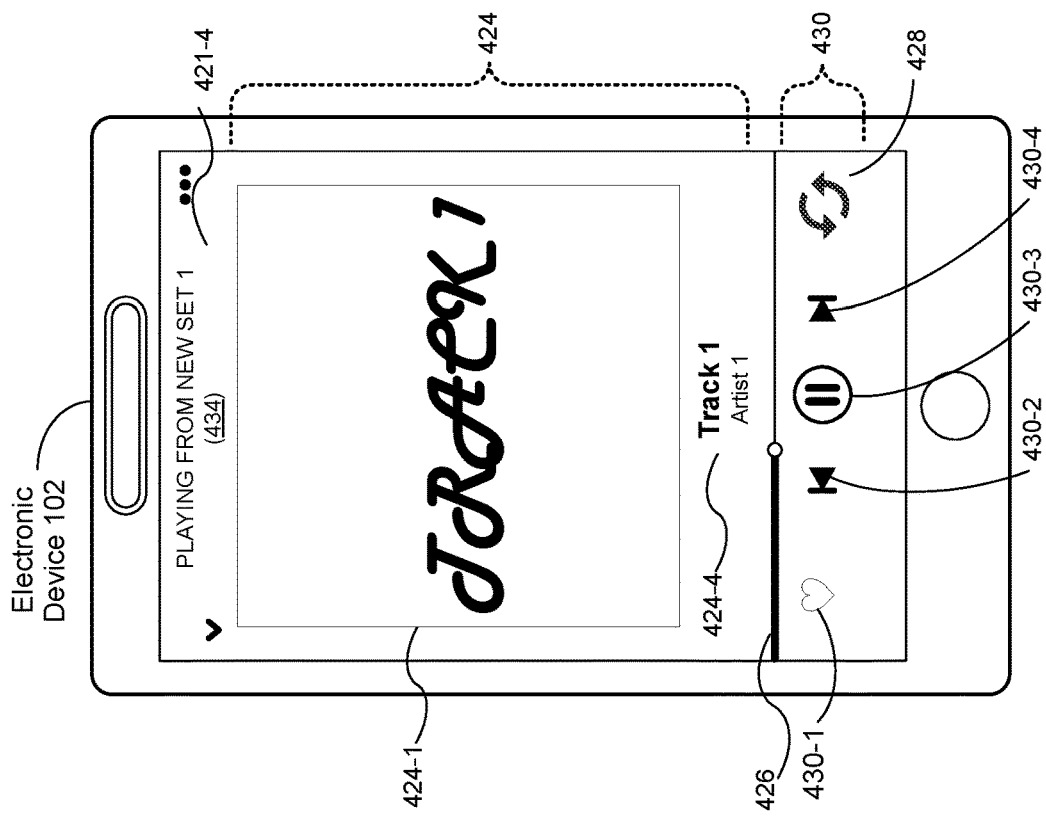
Figure 4C:
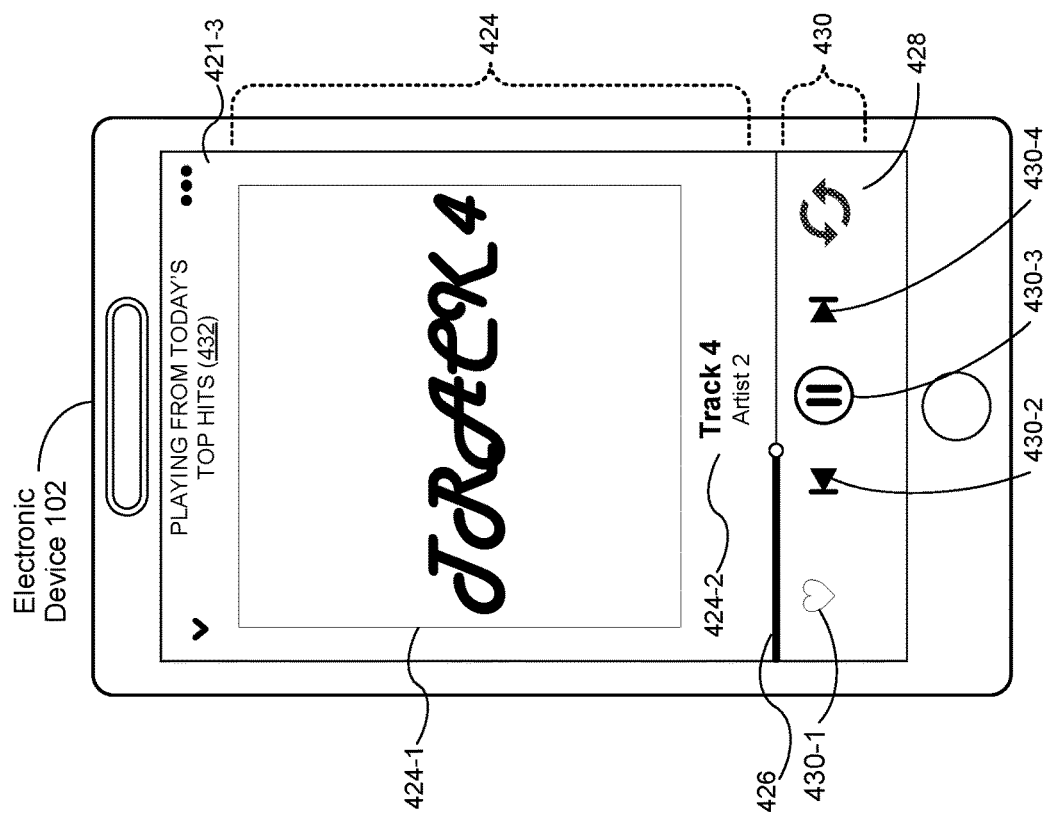

FIGS. 4C-4D illustrate analogous features to FIGS. 4A-4B, except that the user interface 421-3 and 421-4, do not include shuffle button 430-5. In some circumstances, it is advantageous to provide a user interface without shuffle button 430-5, as the device is already operating in a mode that is analogous to a "shuffle" (e.g., by providing recommended tracks to the user in an order determined by the media-providing service). Thus, forgoing provision of next shuffle button 430-5 and replacing it with the next shuffle button 428 (which, FIGS. 4C-4D is in line with the remaining controls 430) saves display space and results in a more intuitive user interface, in which users can "browse with their ears" before settling on a shuffle option.

It should be understood that, although FIGS. 4A-4D illustrate an example in which the user can navigate to a next shuffle by selecting a virtual button displayed in a user interface on a touch-screen display, various other modalities for triggering the next shuffle option are contemplated by the present disclosure. For example, in some embodiments, the user may interact with the device through voice commands, and may switch to the next shuffle by uttering a phrase such as "Go to the next shuffle."

Figure 5A:
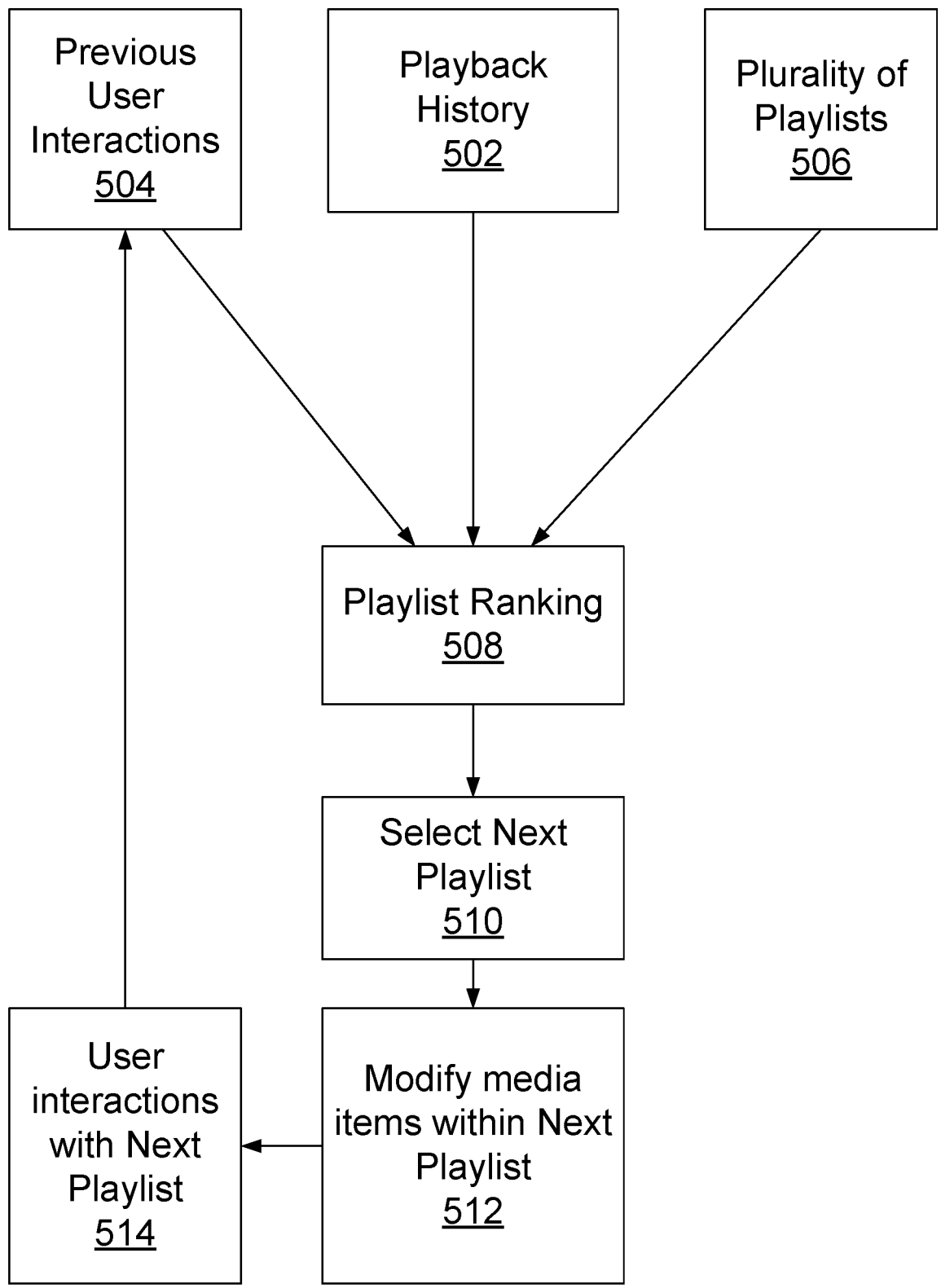
FIG. 5A is a flow diagram illustrating a method for selecting a playlist for presentation to a user, in accordance with some embodiments.

FIG. 5A is a flow diagram illustrating a method for updating an order of playlists (e.g., an order of sets of media items) based on user interactions during a current playback session, in accordance with some embodiments. In some embodiments, the electronic device selects a plurality of playlists 506. In some embodiments, each playlist in the plurality of playlists 506 is associated with a category, as described with reference to FIG. 5B. In some embodiments, each playlist in the plurality of playlists is generated in accordance with a respective recommendation hypothesis, as described above (e.g., one or more playlists personalized for the user and/or one or more playlists curated based on features of media items). In some embodiments, each category corresponds to a type of recommendation hypothesis (e.g., Category A corresponds to one or more recommendation hypotheses based on familiarity to the user, Category B corresponds to one or more recommendation hypotheses based on discovery for the user, etc.).

In some embodiments, the electronic device determines a playlist ranking 508, e.g., an order in which to present each playlist to the user (e.g., playlist 1, playlist 2, playlist 3, etc.). In some embodiments, an initial playlist ranking is determined for the plurality of playlists 506 based at least in part on the playback history 502 of the user and/or previous user interactions 504 with media items. In some embodiments, the playlist ranking 508 is based on an order of categories, as described with reference to FIG. 5B. In some embodiments, the previous interactions 504 with media items include interactions from one or more previous playback sessions (e.g., in a previous session, the user has "skipped" media items by a first artist, the user has "hearted" (favorited) media items of a first genre, the user has replayed a media item, the user selects the "shuffle" control, etc.). As such, the previous interactions 504 of the user with media items are used by the electronic device to determine an initial order of the plurality of playlists (e.g., to promote one or more playlists the user is more likely to enjoy based on the user's previous interactions). Similarly, the playback history 502 of the user is used to determine an initial playlist ranking 508.

For example, playback history 502 includes a list of media items that the user has consumed (e.g., in a previous playback session and/or in a current playback session). In some embodiments, the playback history also includes an indication of a number of times the user consumed the media items.

After generating the initial playlist ranking 508 (e.g., an order of the playlists), the device selects a next playlist 510 to provide for playback at the electronic device. For example, the initial playlist ranking 508 corresponds to an initial order in which the electronic device plans to provide the playlists to the user (e.g., where the playlist provided to the user is updated in response to the user selecting the next shuffle option 428). For example, the electronic device determines the initial order as: playlist 1, playlist 2, playlist 3, etc. Initially, the first playlist presented (playlist 1) is the "Next" playlist 510.

In some embodiments, the electronic device further determines an order of the media items within the currently selected "Next" playlist 510. For example, the electronic device modifies 512 (e.g., reorders) media items within playlist 1 (e.g., based on a playback history of the user and/or user interactions).

In some embodiments, while the electronic device is presenting the currently selected playlist (e.g., playlist 1), the electronic device tracks user interactions 514 with the media items (e.g., determines whether the user is skipping media items having a particular characteristic, such as an artist, genre, mood, etc., and/or whether the user is listening to (e.g., or adding to favorites) other media items having a characteristic particular artist, genre, mood, etc.).

In some embodiments, based on the user interactions 514 with playlist 1, the electronic device updates its log of previous user interactions 504. In some embodiments, user interactions within a current playback session are weighted higher than previous user interactions within a previous playback session (e.g., the user typically does not skip media items with a "Pop" genre, but in the current session is skipping media items with the "Pop" genre).

In some embodiments, the electronic device uses the user interactions from the current playback session to update the playlist ranking 508 (e.g., the user interactions inform the heuristic used to rank the playlists). For example, the electronic device updates the initial playlist ranking 508 (e.g., playlist 1, playlist 2, playlist 3, etc.) to reorder the playlists from the plurality of playlists 506 based on the user interactions (e.g., promote a playlist that has media content items that do have the "Pop" genre). For example, if playlist 2 includes media items with the "Pop" genre, playlist 2 is demoted in the ranking such that playlist 2 is not presented to the user after playlist 1 (e.g., the updated playlist ranking 508 would be playlist 1, playlist 3, . . . , playlist 2, etc.).

The next playlist 510, selected according to the updated playlist ranking, is presented to the user in response to the user selecting the next shuffle option 428. As the user continues interacting with the media items during the current playback session, the electronic device continues updating the order of the playlist ranking and order of media items within the playlists, as shown in FIG. 5A.

Figure 5B:
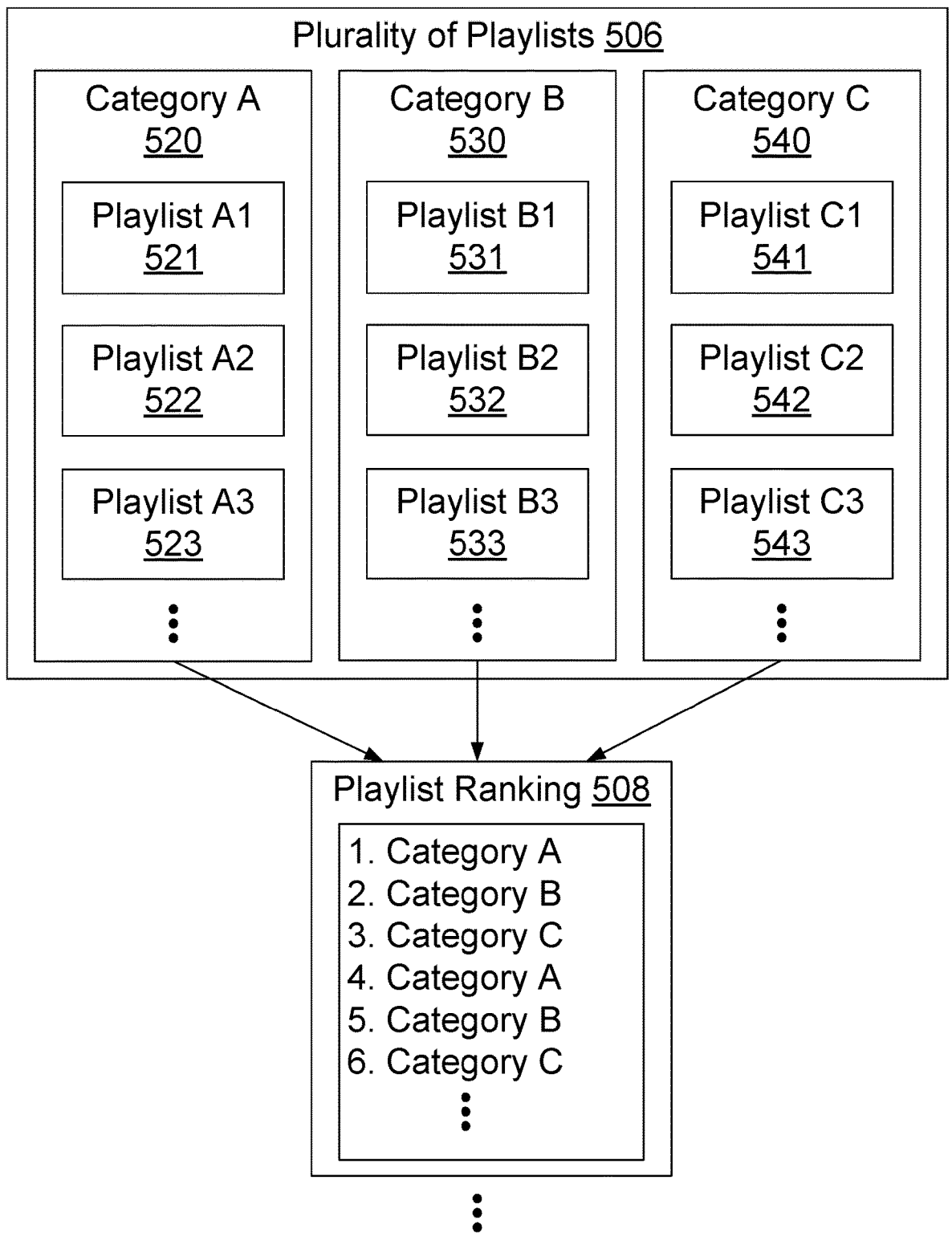
FIG. 5B is a flow diagram illustrating ranking playlists according to categories, in accordance with some embodiments.
Figure 6B:
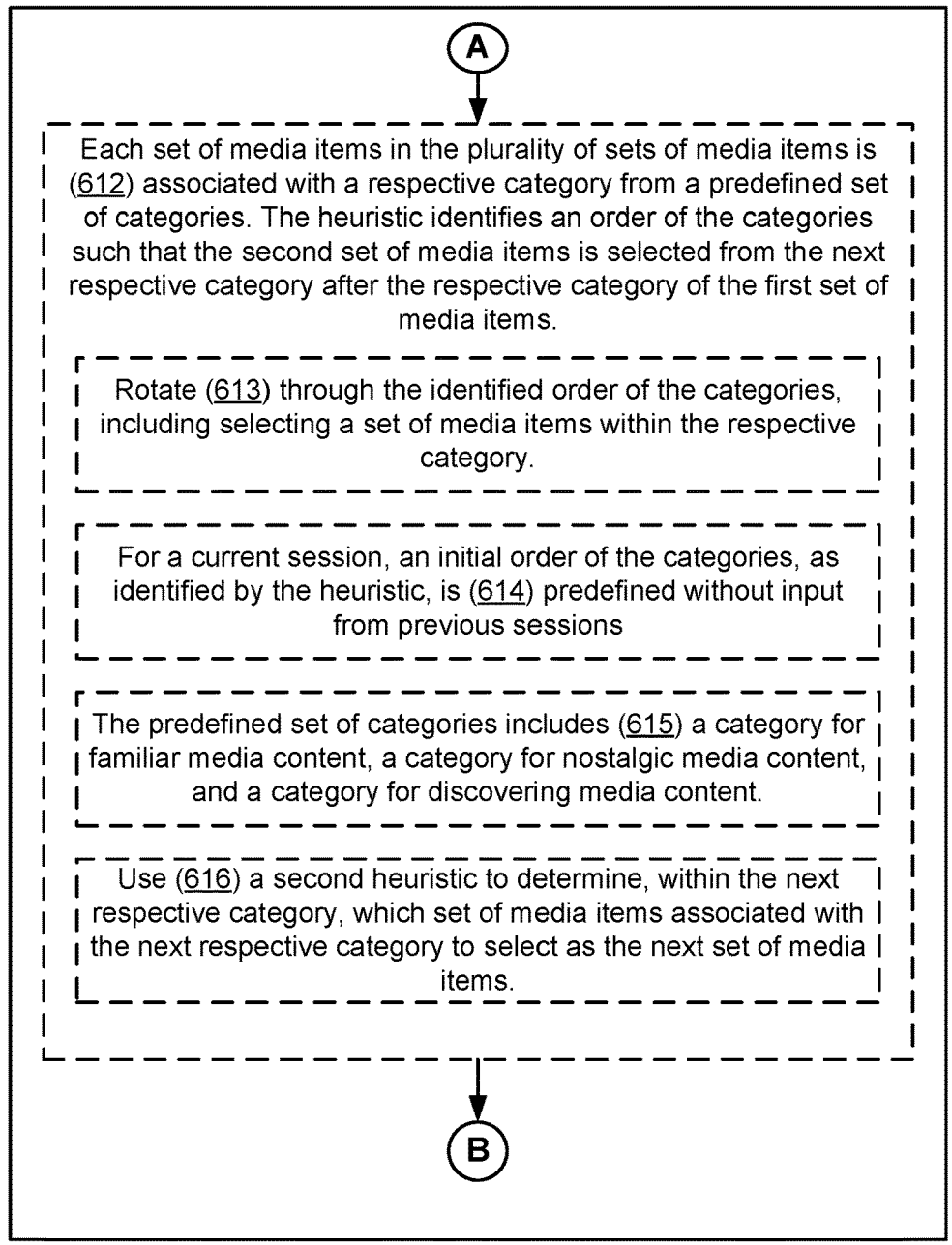
Figure 6C:
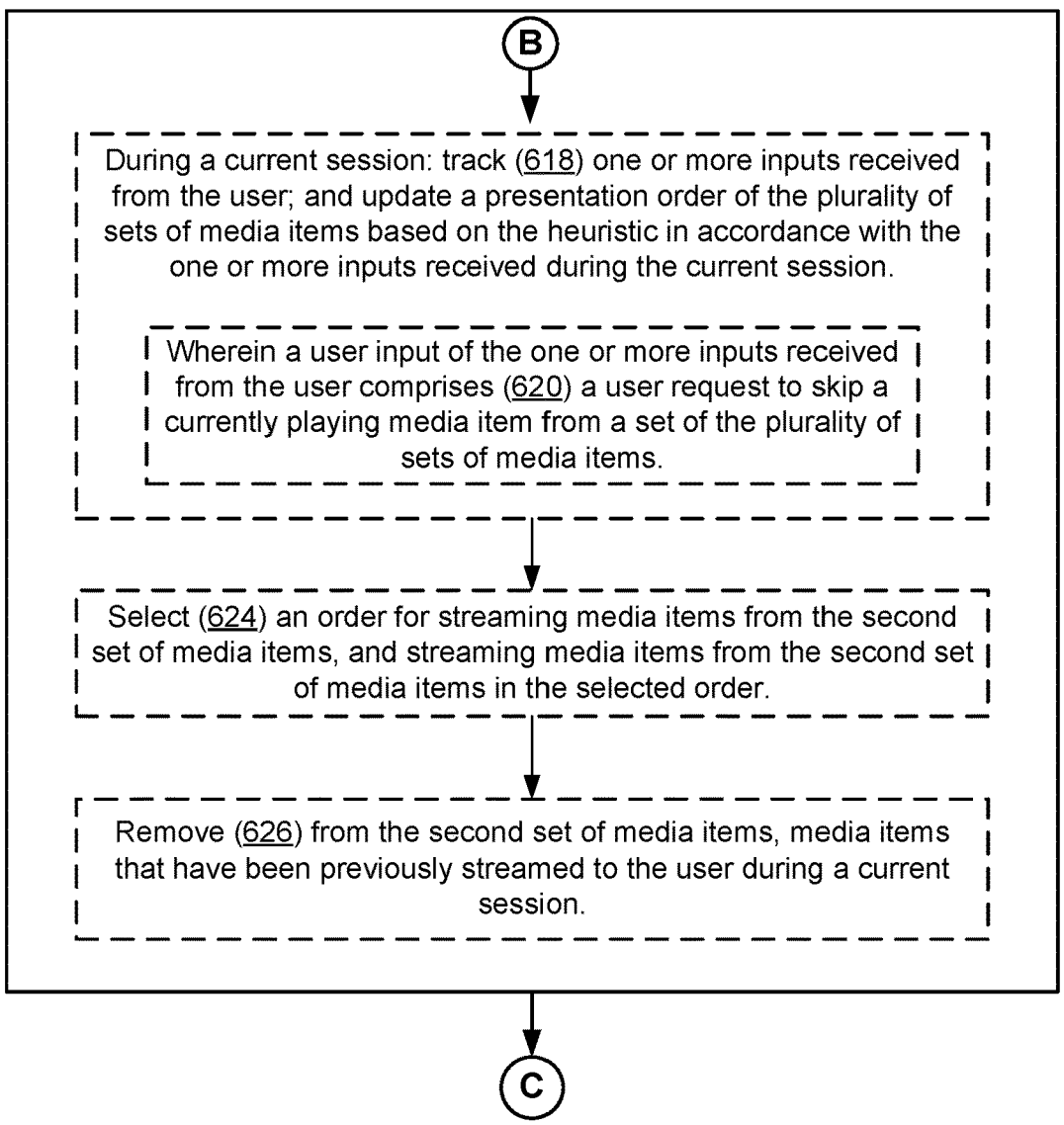
Figure 6D:
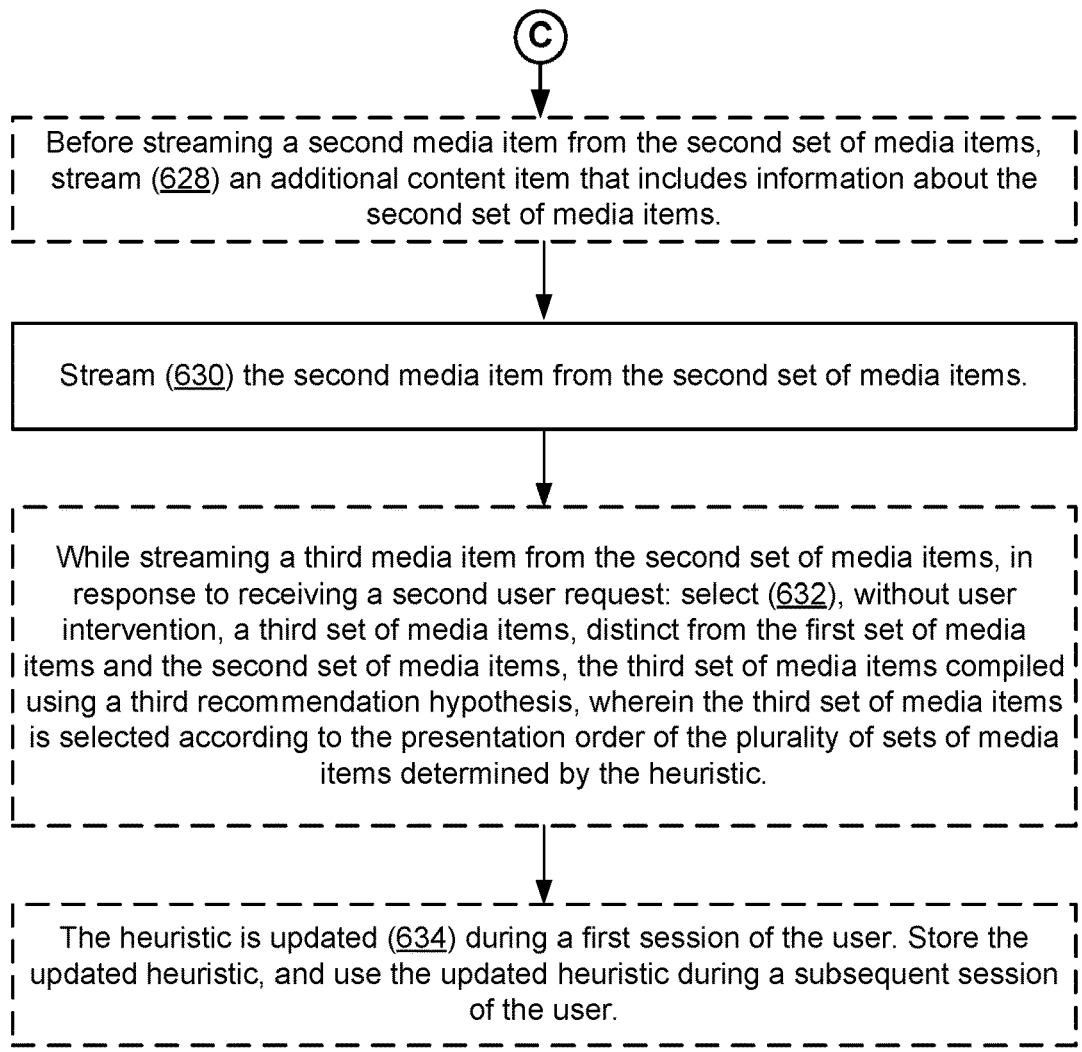

FIG. 5B illustrates a flow diagram for updating a playlist ranking 508 based on respective categories associated with each playlist. In some embodiments, each playlist in the plurality of playlists 506 is associated with a category. For example, the plurality of playlists includes three categories: Category A 520, Category B 530, and Category C 540. It will be understood that the three categories described are merely examples, and that additional and/or alternative categories may be included in the plurality of playlists 506.

In some embodiments, each category includes a plurality of playlists. For example, Category A 520 includes: playlist A1 521, playlist A2 522, and playlist A3 523, Category B 530 includes: playlist B1 531, playlist B2 532, and playlist B3 533, and Category C 540 includes: playlist C1 541, playlist C2 542, and playlist C3 543. In some embodiments, each category includes playlists that are generated from different recommendation hypotheses. For example, Category A includes "familiar" content, which can include playlists curated from a plurality of recommendation hypotheses, so long as each playlist satisfies category criteria. For example, the category criteria for category A includes a criterion that is satisfied in accordance with the user having consumed each playlist, or tracks within the playlist, or tracks sharing a characteristic with the playlist, at least a predetermined number of times in the past (e.g., according to a playback history of the user).

In some embodiments, an initial playlist ranking 508 alternates between categories (e.g., each time the user requests a next playlist, a playlist from the next category is selected). For example, playlist ranking 508 includes, in order, a playlist from category A, a playlist from category B, a playlist from category C, and then repeats the cycle and returns to a playlist from category A, then a playlist from category B, and a playlist from category C, etc. In some embodiments, as described above with reference to FIG. 5A, the user interactions with a currently selected playlist (e.g., "Next Playlist") 514 are added to "previous user interactions" 504 and cause the electronic device to update the playlist ranking 508. In some embodiments, in accordance with the interactions recorded and added to Previous User Interactions 504, the playlist ranking 508 is updated to change the order of categories. For example, the playlist ranking 508 may remove (or otherwise reorder) Category A from the playlist ranking (e.g., such that, instead of selecting a playlist from category A, the electronic device will select a playlist from another category). As such, the user interactions affect an order of the categories of playlist ranking 508.

In some embodiments, the heuristic determines the order in which the categories of playlists are presented (e.g., Category A, then Category B, then Category C).

In some embodiments, the user interactions further affect the playlist selected within each category. For example, within each category, the playlists for the category are ranked according to one or more factors. For example, within each category, the playlists are ranked according to a recommendation engine (e.g., a second heuristic). In some embodiments, after the category of the next selected playlist is identified, a playlist associated with the category is selected according to the recommendations (e.g., playlist A3 523 is selected to be played as the next playlist when Category A 520 is identified as the next category according to playlist ranking 508). In some embodiments, the recommendation engine (e.g., a second heuristic) is updated in accordance with user interactions (e.g., the order in which playlists within a respective category are played back for the user is dynamically updated during a session).

In some embodiments, in accordance with a category being determined as the next category for the next selected playlist, a playlist from the identified category is randomly selected (e.g., not according to any ranking or second heuristic). In some embodiments, after a playlist has been selected, the playlist is not re-selected (e.g., if playlist A1 521 is selected for Category A as the first playlist ("1") in the playlist ranking 508, then playlist A1 521 will not be selected for Category A as the fourth playlist ("4") later).

FIGS. 6A-6D are flow diagrams illustrating a method for streaming media content from sets of media items for a user, in accordance with some implementations. The method 600 is performed at an electronic device (e.g., electronic device 102 and/or media content server 104) with one or more processors, and memory (e.g., server 104, FIG. 1).

In performing the method 600, the electronic device streams (602) (e.g., provides, plays back) a first media item from a first set of media items, the first set of media items compiled using a first recommendation hypothesis. For example, the first set of media items 432 are compiled using a first recommendation hypothesis, as described above with reference to FIG. 4A.

In some embodiments, the first recommendation hypothesis for compiling the first set of media items is (604) based on one or more of a genre of media items, a decade of media items, a mood of media items, an artist of media items, and whether media items have previously been presented to the user. In some embodiments, the first recommendation hypothesis is a playlist that has been curated, either by an algorithm or manually, by a human. For example, the first set of media items 432 (e.g., "Today's Top Hits" playlist) may be selected from a recommender system (e.g., today's top hits recommender system).

The electronic device, while streaming the first media item, in response to a first user request, selects (606) (e.g., predicts), without user intervention, a second set of media items, distinct from the first set of media items, the second set of media items compiled using a second recommendation hypothesis (e.g., the user requests that a new playlist be provided, but selection/prediction of the new play list is performed without user intervention). The second recommendation hypothesis is distinct from the first recommendation hypothesis. In some embodiments, the first user request is a next shuffle option request (e.g., next shuffle option 428).

In some embodiments, the first user request is a request 608 to change to a different set of media items. In some embodiments, the first user request does not specify the different set of media items (e.g., does not specify the next set of media options). For example, the first user request is a user input selecting next shuffle option 428 (e.g., or a voice input including a command to select the next shuffle option 428).

In some embodiments, selecting the second set of media items comprises (610) determining a presentation order of a plurality of sets of media items using a heuristic applied to the plurality of sets of media items, wherein the second set of media items is selected as a next set of media items after the first set of media items in the presentation order. For example, each respective set of media items is compiled using a respective hypothesis (e.g., the second set of media items 434 or another third set of media items is compiled using a specific hypothesis). The heuristic sets an initial order of the plurality of sets of media items (e.g., first set of media items 432, second set of media items 434, third set of media items, etc.), and as the heuristic is updated based on user behavior, the order of the plurality of sets of media items is changed (e.g., a first set, second set, fifth set, third set, etc.).

In some embodiments, the heuristic is (611) based on one or more of a playback history of the user, user inputs in a current session (e.g., the electronic device is statefully aware of user interactions during the current playback session), user inputs in previous sessions and user profile information (e.g., premium users versus non-premium users, user demographics, user preferences). For example, as described above, user inputs in a current session may include skip inputs which may skip a song once the user selects a skip input. In some embodiments, the heuristic is a predefined heuristic. For example, the sets of media items are presented (e.g., played back) in an initial order (e.g., the second set is streamed after the first set).

In some embodiments, each set of media items in the plurality of sets of media items is (612) associated with a respective category (also referred to as a respective "segment") from a predefined set of categories (e.g., multiple sets of media items fall within a particular category), and the heuristic identifies an order of the categories such that the second set of media items is selected from the next respective category after the respective category of the first set of media items. In some embodiments, the predefined set of categories includes a category for familiar media content, a category for nostalgic media content, and a category for discovery (e.g., content the user may not be familiar with). In some embodiments, the playlists associated with each category are user-specific. For example, the playlists that are associated with the category "familiar" to a first user are distinct from playlists that are associated with the category "familiar" to a second user. In some embodiments, the playlists are selected based at least in part on a playback history of the user (e.g., stored in a profile of the user).

In some embodiments, the electronic device rotates (613) through the identified order of the categories (e.g., until the heuristic is updated, and the order of the categories is updated accordingly), including selecting a set of media items within the respective category. For example, as described with reference to FIG. 5B, a playlist ranking 508 is established that includes an initial order of the categories that cycles through Category A, B and C and then repeatedly loops through the categories in that order.

In some embodiments, for a current session, an initial order of the categories, as identified by the heuristic, is (614) predefined without input from previous sessions. In some embodiments, the initial order of the categories is determined independently of previous sessions (e.g., for each new session, the initial order of the categories is predefined). For example, regardless of prior user interaction (e.g., indicating that a user tends to not playback media content from Category A), the playlist ranking 508 is set to cycle through all of the categories (e.g., cycling through Category A, B and C repeatedly).

In some embodiments, the initial order of the categories is determined based at least in part on a previous session (e.g., the most recent heuristic, as updated during the previous session). For example, the electronic device determines, based on previous user interaction, that the user skips media content and/or selects the next shuffle button 428 to change to a different playlist within a predefined time period (e.g., within the first 1, 2 or 3 media content items of the current playlists), that the user tends to not playback media content from a particular category (e.g., Category A). In some embodiments, in response to the determination that the user tends to not playback media content from the particular category, the electronic device removes the category from the playlist ranking 508 (e.g., the playlist ranking 508 is updated to cycle through Category B and Category C, then Category B and Category C, repeatedly (e.g., without including Category A in the ranking)).

In some embodiments, the predefined set of categories includes (615) a category for familiar media content, a category for nostalgic media content, and a category for discovering media content. In some embodiments, playlists are associated with each category in the predefined set of categories in accordance with a determination that the respective playlists satisfies category criteria associated with the respective category. For example, the category criteria for familiar media content comprises a criterion that is met by the playlist in accordance with the playlist (or songs within the playlists, or songs sharing a characteristic with the playlist) having been consumed at least a threshold number of times by the user. In some embodiments, the category criteria for nostalgic media content comprises a criterion that is met by a playlist in accordance with the playlist being associated with a predefined year or time period of relevance for the user (e.g., the user tends to listen to music from the nineties). In some embodiments, the category criteria for discovery media content comprises a criterion that is met in accordance with the playlist including media content that has been consumed less than a threshold number of times by the user (e.g., unconsumed media content).

In some embodiments, the electronic device uses (616) a second heuristic to determine, within the next respective category, which set of media items within the next respective category to select as the next set of media items. For example, the heuristic (e.g., a first heuristic) is used to identify the next respective category, as explained above, and a second heuristic is used to identify, within the next respective category, which playlist (e.g., set of media items) to select from the next respective category to stream to the user. As such, within each category, a ranking of sets of media items is also performed, using the second heuristic. In some embodiments, the second heuristic is updated in accordance with user interaction. In some embodiments, the second heuristic uses a different set of criteria than the first heuristic. For example, the first heuristic is based on whether the user interactions tend to skip a category, and the second heuristic is based on whether the user is interested in a particular genre.

In some embodiments, during a current session, the electronic device tracks (618) one or more inputs received from the user (e.g., the user skipping a media item or selecting the next shuffle option 428), and updates a presentation order of the plurality of sets of media items based on the heuristic in accordance with the one or more inputs received during the current session. For example, based on receiving the next shuffle option 428 in FIG. 4A, a second set of media items 434 is streamed at electronic device 102. For example, the presentation order is preset (e.g., for a first session), and, as the user interacts with the media items, the heuristic used to determine the presentation order is updated in accordance with the user interaction. As such, the playlist ranking 508 (FIGS. 5A-5B) is changed from an initial order to a new order. In some embodiments, the heuristic is updated to remove and/or add a category of playlists. For example, in accordance with a determination that the user skips two or more playlists from "Category A," the playlist ranking 508 is updated to remove "category A" from the ranking (e.g., playlists from Category A will not be selected or presented to the user). In some embodiments, in accordance with one or more positive inputs received from the user for playlists associated with a respective category (e.g., the user "favorites" media items from playlists associated with Category B), the heuristic is updated to present additional media content associated with the same category (e.g., the playlist ranking 508 is updated to insert additional playlists from Category B).

In some embodiments, a user input of the one or more inputs received from the user comprises (620) a user request to skip a currently playing media item from a set of the plurality of sets of media items. For example, a request to skip a currently streaming media item is received within a predefined amount of time of streaming the media item (e.g., within 3 seconds, within 10 seconds, etc.) In some embodiments, the request to skip a currently playing media item is a request to skip to a next media item from a same set of media items that includes the currently playing media item (e.g., selecting the skip to next control 430-4). In some embodiments, a user input of the one or more inputs received from the user comprises a user request to heart (e.g., add to favorites) a media item (e.g., control 430-1).

In some embodiments, the electronic device selects (624) an order for streaming media items from the second set of media items, and streams media items from the second set of media items in the selected order. In some embodiments, the electronic device reorders the second set of media items (e.g., based on the heuristic, or another heuristic, such as a third heuristic). For example, the electronic device changes an order in which to present media items within the second set of media items (e.g., to promote media items that match a current taste profile of the user (e.g., in the current playback session)). As such, the electronic device controls an order of presentations of media items within a selected playlist.

In some embodiments, the electronic device removes (626) from the second set of media items, media items that have been previously streamed to the user during a current session (e.g., to prevent repeating media items in a current playback session). In some embodiments, the media items that have been previously streamed include media items that were skipped before the user streamed the entire media item. In some embodiments, the media items that have been previously streamed include media items that were streamed in full (e.g., the user listened to the full length of the media item). For example, if a media item is played and the user hits the next shuffle option 428, that item is not repeated in the next set of media items. In some embodiments, the second set of media items has overlap (e.g., similarity) to one or more media items in the first set of media items. In some embodiments, the second set of media items is selected to be distinct from the first media item in the first set of media items.

In some embodiments, before streaming a second media item from the second set of media items, the electronic device streams (628) an additional content item that includes information about the second set of media items. For example, after receiving a user input to next shuffle to a new recommendation hypothesis, an audio explanation is generated as a transition between the previously playing playlist and the next playlist to orient the user. In some embodiments, the additional content item comprises a narrator explaining, to the user, a reasoning behind the selection of the next playlist, or otherwise shares additional facts, a story, or other information about the next playlist. As such, the user participates in an experience during which the automatic playlist selection is explained and the user is more closely involved with the selection process. In some embodiments, providing an explanation of the transition between playlists (e.g., seemingly unrelated playlists) provides improved feedback to the user to improve the way in which the user is able to interact with the electronic device.

The electronic device streams (630) a second media item from the second set of media items. For example, the electronic device streams "Track 1" from "New Set 1" in FIG. 4B (e.g., to the electronic device 102, or another presentation device).

In some embodiments, while streaming a third media item from the second set of media items, in response to receiving a second user request, the electronic device selects (632), without user intervention, a third set of media items, distinct from the first set of media items and the second set of media items, the third set of media items compiled using a third recommendation hypothesis, wherein the third set of media items is selected according to the presentation order of the plurality of sets of media items determined by the heuristic.

In some embodiments, the heuristic is updated (634) during a first session of the user. In some embodiments, the electronic device stores the updated heuristic, and uses the updated heuristic during a subsequent session of the user (e.g., the presentation order of the plurality of sets of media items is based at least in part on a previous session of the user). In some embodiments, the heuristic is stored with a user profile such that the updated heuristic carries over from one session of the user to a next session of the user. In some embodiments, the updated heuristic is reset (e.g., to an initial heuristic) in accordance with satisfaction of one or more criteria. For example, in accordance with a determination that the user has not consumed content within a predefined window (e.g., the past week, the past month, etc.), the heuristic is reset to the initial, predefined heuristic.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. An electronic device, comprising:
one or more processors; and
a memory storing one or more programs executable by the one or more processors, the one or more programs including instructions for:
 streaming a first media item from a first playlist, the first playlist comprising a plurality of media items curated for a user using a first recommendation hypothesis;
 while streaming the first media item, receiving a first user input;
 in response to the first user input:
  selecting, using a heuristic applied to a plurality of playlists, without user intervention, a second playlist from the plurality of playlists as a differently-curated next playlist, distinct from the first playlist, wherein:
   the second playlist is curated for the user using a second recommendation hypothesis,
   the second recommendation hypothesis curates media items differently than the first recommendation hypothesis, and
   selecting the second playlist from the plurality of playlists includes determining a presentation order of the plurality of playlists, each playlist including a plurality of media items curated using a respective recommendation hypothesis, using the heuristic applied to the plurality of playlists, wherein the second playlist is selected as the differently-curated next playlist after the first playlist in the presentation order; and
  streaming a second media item from the second playlist.

2. A method for personalizing media content for a user, comprising:
at an electronic device:
 streaming a first media item from a first playlist, the first playlist comprising a plurality of media items curated for the user using a first recommendation hypothesis;
 while streaming the first media item, in response to a first user input, selecting, without user intervention, a differently-curated next playlist, distinct from the first playlist, including:
  determining a presentation order of a plurality of playlists, each playlist including a plurality of media items curated using a respective recommendation hypothesis, using a heuristic applied to the plurality of playlists, wherein:
   a second playlist is selected as the differently-curated next playlist after the first playlist in the presentation order; and
   the second playlist is curated for the user using a second recommendation hypothesis, wherein the second recommendation hypothesis curates media items differently than the first recommendation hypothesis; and
 streaming a second media item from the second playlist.

3. The method of claim 2, wherein the first user input corresponds to a request to change to a different playlist.

4. The method of claim 3, wherein the first user input does not specify the second playlist.

5. The method of claim 2, wherein the heuristic is based on one or more of: a playback history of the user, user inputs in a current session, user inputs in previous sessions, and user profile information.

6. The method of claim 2, further comprising, during a current session:
 tracking one or more inputs received from the user; and
 updating the presentation order of the plurality of playlists based on the heuristic in accordance with the one or more inputs received during the current session.

7. The method of claim 6, wherein a respective user input of the one or more inputs received from the user comprises a user request to skip a currently playing media item from a set of the plurality of playlists.

8. The method of claim 2, further comprising:
 while streaming a third media item from the second playlist, in response to receiving a second user input:
 selecting, without user intervention, a third playlist, distinct from the first playlist and the second playlist, the third playlist compiled using a third recommendation hypothesis, wherein the third playlist is selected according to the presentation order of the plurality of playlists determined by the heuristic.

9. The method of claim 2, further comprising:
 selecting an order for streaming media items from the second playlist; and
 streaming media items from the second playlist in the selected order.

10. The method of claim 2, wherein the first recommendation hypothesis for compiling the first playlist is based on one or more of a genre of media items, a decade of media items, a mood of media items, an artist of media items, and whether media items have previously been presented to the user.

11. The method of claim 2, further comprising, removing, from the second playlist, media items that have been previously streamed to the user during a current session.

12. The method of claim 2, wherein:
 each playlist in the plurality of playlists is associated with a respective category from a predefined set of categories; and
 the heuristic identifies an order of the categories such that the second playlist is selected from a next respective category after the respective category of the first playlist.

13. The method of claim 12, further comprising, rotating through the identified order of the categories, including selecting a playlist within the respective category.

14. The method of claim 12, wherein, for a current session, an initial order of the categories, as identified by the heuristic, is predefined without input from previous sessions.

15. The method of claim 14, wherein the predefined set of categories includes a category for familiar media content, a category for nostalgic media content, and a category for discovering media content.

16. The method of claim 12, further comprising, using a second heuristic to determine, within the next respective category, which playlist within the next respective category to select as the differently-curated next playlist.

17. The method of claim 2, further comprising, before streaming the second media item from the second playlist, streaming an additional content item that includes information about the second playlist.

18. The method of claim 2, wherein:
the heuristic is updated during a first session of the user; and the method further comprises:
storing the updated heuristic, and
using the updated heuristic during a subsequent session of the user.

19. A non-transitory computer-readable storage medium storing instructions executable by a first electronic device associated with a first user account, the instructions including instructions for:

streaming a first media item from a first playlist, the first playlist comprising a plurality of media items curated for a user using a first recommendation hypothesis;

while streaming the first media item, in response to a first user input, selecting, without user intervention, a differently-curated next playlist, distinct from the first playlist, including:

determining a presentation order of a plurality of playlists, each playlist including a plurality of media items curated using a respective recommendation hypothesis, using a heuristic applied to the plurality of playlists, wherein:

a second playlist is selected as the differently-curated next playlist after the first playlist in the presentation order; and the second playlist is curated for the user using a second recommendation hypothesis, wherein the second recommendation hypothesis curates media items differently than the first recommendation hypothesis; and streaming a second media item from the second playlist.

* * * * *